United States Patent [19]

Buese

[11] Patent Number: 4,598,135

[45] Date of Patent: Jul. 1, 1986

[54] METHOD FOR MAKING NORBORNANE ANHYDRIDE SUBSTITUTED POLYORGANOSILOXANE

[75] Inventor: Mark A. Buese, Ballston Spa, N.Y.

[73] Assignee: General Electric Company, N.Y.

[21] Appl. No.: 793,360

[22] Filed: Oct. 31, 1985

[51] Int. Cl.⁴ ............................................. C08G 77/06
[52] U.S. Cl. ...................................... 528/23; 528/26;
528/33; 549/237; 549/234; 549/235; 549/236
[58] Field of Search .......................... 528/23, 26, 33;
549/237, 234, 235, 236

[56] References Cited

U.S. PATENT DOCUMENTS 4,381,396  4/1983  Ryang ............................... 549/237

Primary Examiner—Melvyn I. Marquis
Attorney, Agent, or Firm—William A. Teoli; James C. Davis, Jr.; James Magee, Jr.

[57] ABSTRACT

A method is provided for making norbornane anhydride substituted organosiloxane by equilibrating norbornane anhydride organosiloxane with cyclopolydiorganosiloxane, organopolysiloxane and mixtures thereof under neat conditions. A reduction in the amount of cyclopolydiorganosiloxane generated in the mixture is realized compared to solvent equilibration procedures.

6 Claims, No Drawings

METHOD FOR MAKING NORBORNANE ANHYDRIDE SUBSTITUTED POLYORGANOSILOXANE

BACKGROUND OF THE INVENTION

Prior to the present invention, as shown by Ryang, for Silylnorbornane Anhydrides and Methods for Making, U.S. Pat. No. 4,381,396, assigned to the same assignee as the present invention and incorporated herein by reference, silylnorbornane anhdyrides were made by effecting reaction between 5-norbornene-2,3-carboxylic anhydride and a silicon hydride in the presence of a platinum catalyst. As taught by Ryang, anhydride terminated polydiorganosiloxane was made by equilibrating the 1,3-bis(norbornane-dicarboxylic anhydride)(tetraorganodisiloxane with cyclopolydiorganosiloxane in the presence of an organic solvent such as toluene and an equilibration catalyst such as sulfuric acid. Although valuable results can be achieved by Ryang in accordance with the aforementioned equilibration procedure, experience has shown that when equilibration is conducted in the presence of an organic solvent, a significant amount of cyclopolydiorganosiloxane is generated, which can be up to 99% by weight of the initial diorganosiloxane utilized mixture. It would be desirable to make norbornane anhydride substituted organosiloxane utilizing norbornane-dicarboxylic anhydride siloxane along with cyclopolydiorganosiloxane or organo terminated polydiorganosiloxane or mixtures thereof to produce norbornane anhydride substituted organosiloxane without the generation of a significant amount of cyclopolydiorganosiloxane.

The present invention is based on my discovery that 1,3-bis(norbornane dicarboxylic anhydride)tetraorganodisiloxane such as 5,5'-(1,1,3,3-tetramethyl-1,3-disiloxanediyl)-bis-norbornane-2,3-dicarboxylic anhydride can be heated with either cyclopolydiorganosiloxane, such as octamethylcyclotetrasiloxane, or triorganosiloxy chain stopped polydiorganosiloxane, such as dimethylvinylsiloxy chain stopped polydimethylsiloxane or trimethylsiloxy chain stopped polymethylvinylsiloxysiloxane or mixtures thereof in the presence of an equilibration catalyst under neat conditions at temperatures as high as 200° C. Surprisingly, no cleavage of the norbornane anhydride or organosiloxane structure results, such as silicon-carbon bonds, or anhydride bonds, while forming the norbornane anhydride substituted organosiloxane, and the formation of cyclopolydiorganosiloxane is minimized.

STATEMENT OF THE INVENTION

There is provided by the present invention, a method for making symmetric or asymmetric substituted norbornane anhydride substituted organosiloxane which comprises, (1) equilibrating under neat conditions in the presence of an effective amount of an equilibration catalyst, a mixture comprising
 (A) norbornane-dicarboxylic anhydrideorganosiloxane and
 (B) organosiloxane selected from the class consisting of cyclopolydiorganosiloxane, organo terminated polyorganosiloxane, or a mixture thereof, and (2) recovering norbornane anhydride substituted organosiloxane from the mixture of (1).

Some of the norbornane dicarboxylic acid anhydride organosiloxanes which can be used in the practice of the present invention are shown by the following formulas,

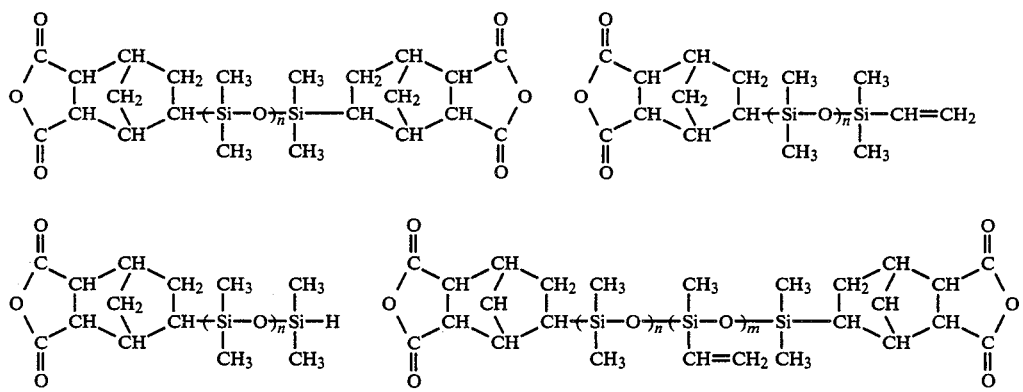

where n and m are equal to 1 to 10, inclusive.

Among the organosiloxane which can be utilized in the practice of the present invention are cyclopolydiorganosiloxane, such as

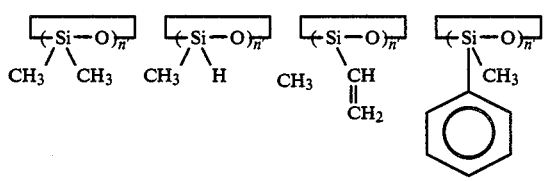

where n' is equal to 3 to 12 inclusive.

In addition to the above cyclopolydiorganosiloxane, there also can be utilized linear or branched organosiloxane such as

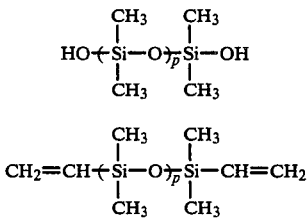

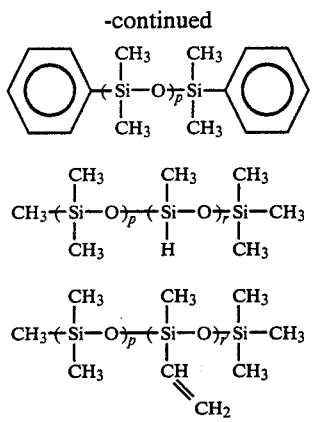

where p is equal to 1 to 1000 inclusive, and r and r' are equal to 1 to 50 inclusive.

Equilibration catalysts which can be employed in the practice of the present invention are, for example, sulfuric acid, trifluoromethane sulfonic acid, perfluorinated ion-exchange powder, etc.

An effective amount of equilibration catalyst is from 0.001 to 5% by weight of catalyst based on the weight of the reaction mixture.

In the practice of the present invention, a mixture of norbornane anhydride organosiloxane, cyclodiorganopolysiloxane, or organosiloxane end stopped polyorganosiloxane, or a mixture of such organosiloxane is heated under neat conditions at a temperature in the range of from 25° C. to 200° C., while the mixture is agitated in the presence of an effective amount of equilibration catalyst. Depending upon the molecular weight of the norbornane anhydride organosiloxane desired, the proportions of norbornane anhydride and organosiloxane which can include cyclopolydiorganosiloxane and end stopped polydiorganosiloxane can vary widely. In particular instances, polydiorganosiloxane having chemically combined organosiloxy norbornane anhydride units can be employed to produce polydiorganosiloxane having chemically combined norbornane anhydride terminal groups, and chemically combined norbornane anhydride siloxy units in the backbone of the polydiorganosiloxane.

The desired norbornane anhydride organosiloxane can be separated from the labile cyclopolydiorganosiloxane after equilibration has been completed in accordance with the following procedure:

The equilibrated mixture of norbornane anhydride terminal polydiorganosiloxane can be stirred wth a catalyst quenching agent, such as MgO, and filtered, folllowed by stripping of cylcodiorganosiloxanes. Stripping can be achieved by increasing the temperature, or reducing the pressure, or both, of the system and distilling the volatile cyclic polydiorganosiloxanes. Additional quenching agents are calcium oxide, zinc oxide, copper oxide, which can be used at from 1.1 to 1000 moles based on the moles of equilibration catalyst.

The silylnorbornane anhydride terminated organosiloxane of the present invention can be utilized in making silicone polyimide block polymers useful as silicone elastomeric adhesives or as epoxy resin curing agents.

In order that those skilled in the art will be better able to practice the present invention, the following examples are given by way of illustration and not by way of limitation. All parts are by weight.

EXAMPLE 1

There was added 25 microliters of trifluoromethane sulfonic acid to a mixture while it was being stirred of 0.504 grams (1.09 millimole) of 5,5'-(1,1,3,3-tetramethyl-1,3-disiloxanediyl)bis-norbornane-2,3-dicarboxylic anhydride and 4.6001 gram (15.51 millimole) portion of octamethylcyclotetrasiloxane. The resulting crude mixture was then heated on a hot plate to a temperature of 200° C. After a 10 minute heating period, the suspension became a clear, colorless homogeneous liquid. The mixture was then allowed to cool and was stirred at room temperature for a period of about 12 hours. The equilibration catalyst was then quenched with 0.1 gram of magnesium oxide and the resulting fluid filtered. There was obtained a polydimethylsiloxane having an average of about 52 chemically combined dimethylsiloxy units with terminal norbornane anhydride units and about 10% by weight of cyclopolydimethylsiloxane based on the weight of octamethylcyclotetrasiloxane initially charged to the mixture.

The above procedure was repeated except that there was utilized 4.1 grams of toluene in the mixture which was stirred over a period of 16 hours at 50° C. There was obtained a polydimethylsiloxane having terminal norbornane anhydride groups and consisting of an average of about 39 chemically combined dimethylsiloxy units. There also was obtained 32 percent by weight of cyclopolydimethylsiloxanes based on the weight of octamethylcyclotetrasiloxane initially charged to the mixture.

EXAMPLE 2

A mixture of 0.7012 grams (1.52 millimole) of 5,5'-(1,1,3,3-tetramethyl-1,3-siloxanediyl)bis-norbornane-2,3-dicarboxylic anhydride, 4.2706 grams of a trimethylsiloxy end capped polydimethylsiloxane fluid consisting essentially of about 48 chemically combined dimethylsiloxy units, and 15 microliters of trifluoromethane sulfonic acid was stirred on a hot plate at a temperature up to 400° C. for 5 minutes. The mixture was moved from the hot plate and quenched with 0.1 grams magnesium oxide and filtered. Based on high pressure liquid chromatography and gas chromatography there was obtained 33% by weight of norbornane end stopped polydimethylsiloxane having an average of about 20 dimethylsiloxy units, about 46% of polydimethylsiloxane having terminal norbornane anhydride units and trimethylsiloxy units and about 9% cyclopolydimethylsiloxane by weight of the charged dimethylsiloxy units in the fluid.

The same procedure was repeated, except that there was used 4.2 grams of toluene and the mixture was refluxed at a temperature of 50° C. for 16 hours. It was found that the mixture contained 30% by weight of cyclopolydimethylsiloxane based on the weight of dimethylsiloxane units initially charged in the mixture. The remaining equilibration products were norbornane terminated polydimethylsiloxane, polydimethylsiloxane having both norbornane anhydride termination and trimethylsiloxy termination and polydimethylsiloxane chain stopped with trimethylsiloxy units. These results show that equilibration of the bis-norbornane anhydride tetramethyldisiloxane with polydimethylsiloxane under neat conditions can provide for a significantly greater proportion of norbornane end stopped polydimethylsiloxane and a reduced amount of cyclopolydimethylsiloxane, as compared to equilibrating the same mixture in the presence of an organic solvent.

EXAMPLE 3

A mixture of 0.7015 grams (1.52 millimole) of the bis-norbornane anhydride tetramethyldisiloxane of Example 1 and 4.0453 grams (18.19 millimoles) of hexamethycyclotrisiloxane in the presence of 10 microliter of trifluoromethane sulfonic acid at a temperature of 170° C. with stirring, resulted in the production of polydimethylsiloxane having an average of about 32 chemically combined dimethylsiloxy units and terminal norbornane anhydride units. In addition, there was obtained about 11 weight percent of cyclopolydimethylsiloxane based on the original charge of dimethylsiloxy units in the original hexamethylcyclotrisiloxane originally reacted.

EXAMPLE 4

A mixture of 0.9153 grams (1.98 millimole) of 5,5'-(1,1,3,3-tetramethyl-1,3-disiloxanediyl)bis-norbornane-2,3-dicarboxylic anhydride, 3.2752 grams (11.04 millimoles) of octamethylcyclotetrasiloxane and 10 microliters of trifluoromethane sulfonic acid was stirred at 170° C. When the mixture became homogeneous, it was cooled and 0.50 milliliters (2.18 millimoles) of 1,3-divinyltetramethyldisiloxane was added. The mixture was then stirred at 150° C. for 12 hours. It was then quenched with 0.1 grams magnesium oxide and filtered. Based on high pressure liquid chromatography and gas chromatography analysis, it was found that the mixture consisted of 10 mole percent, based on the original moles of dimethylsiloxy units reacted as octamethylcyclotetrasiloxane of cyclopolydimethylsiloxane in the mixture, and approximately a 1:2:1 ratio of a polydimethylsiloxane having terminal norbornane anhydride groups and an average of 10 chemically combined dimethylsiloxy units, a polydimethylsiloxane having an average of 10 chemically combined dimethylsiloxy units and terminal norbornane and dimethylvinylsiloxy units and a polydimethylsiloxane having an average of about 10 chemically combined dimethylsiloxy units and terminal dimethylvinylsiloxy units.

The same procedure was repeated, except that there was used 17.8 grams of toluene in the mixture which was equilibrated with stirring at 50° C. for 16 hours. It was found that the mixture contained 47 mole percent of cyclopolysiloxane and the balance of the mixture consisted of the aforementioned ingredients in a substantially similar molar ratio.

EXAMPLE 5

A mixture of 0.8900 grams (1.92 millimole) of the bis-norbornane dianhydride of Example 1, 3.2591 grams (10.99 millimoles) of octamethylcyclotetrasiloxane, 0.6 ml. (2.05 millimoles) of 1,3-diphenyltetramethyldisiloxane and 10 microliters of trifluoromethane sulfonic acid was heated with stirring at 170° C. When the mixture became homogeneous, it was allowed to cool and quenched with 0.1 grams magnesium oxide and filtered. There was obtained a 1:2:1 mixture of norbornane anhydride terminated polydimethylsiloxane having an average of about 10 chemically combined dimethylsiloxane units, polydimethylsiloxane having an average of about 10 chemically combined dimethylsiloxy units and terminated with a norbornane anhydride group and a phenyl radical and a polydimethylsiloxane having phenyl termination at an average of about 10 chemically combined dimethylsiloxy units. It was also found that there was about 9 mole percent of cyclopolysiloxane based on the moles of methylsiloxane originally used in the form of octamethylcyclotetrasiloxane.

Although the above examples are directed to only a few of the very many variables which can be utilized in the method of the present invention, it should be understood that the method of the present invention is directed to the synthesis of a much broader variety of norbornane terminated polydiorganosiloxane as shown in the description preceding these examples.

What I claim as new and desire to secure by Letters Patent of the United States is:

1. A method for making symmetric or asymmetric substituted norbornane anhydride terminated polydiorganosiloxane which comprises
    (1) equilibrating under neat conditions in the presence of an effective amount of an equilibration catalyst a mixture comprising
        (A) norbornane-dicarboxylic anhydride organosiloxane and
        (B) organosiloxane consisting essentially of a member selected from the class consisting of cyclopolydiorganosiloxane, triorgano terminated polydiorganosiloxane, and a mixtures thereof,
    (2) recovering norbornane anhydride terminated polydiorganosiloxane from the mixture of (1).

2. A method in accordance with claim 1, where the norbornane-dicarboxylic anhydride is 1,3-bis(norbornane-dicarboxylic anhydride)tetraorganodisiloxane.

3. A method in accordance with claim 1, where the organosiloxane is cyclopolydimethylsiloxane.

4. A method in accordance with claim 1, where the organosiloxane is dimethylvinyl terminated polydimethylsiloxane.

5. A method in accordance with claim 1, where the equilibration catalyst is trifluoromethane sulfonic acid.

6. A method in accordance with claim 1, where the mixture is quenched with magnesium oxide.

* * * * *